2,811,797

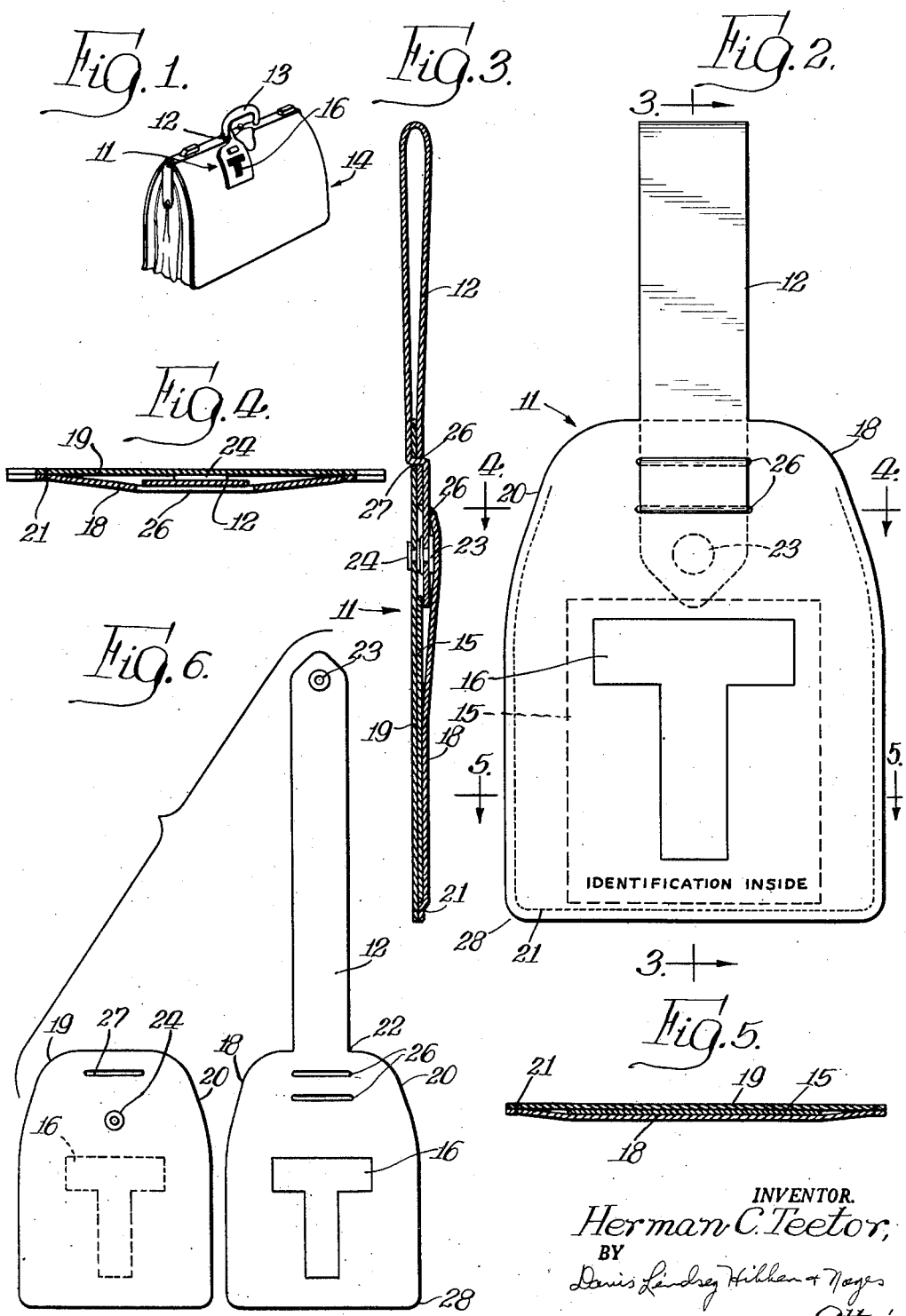

LUGGAGE TAG

Herman C. Teetor, Hagerstown, Ind.

Application November 7, 1955, Serial No. 545,394

4 Claims. (Cl. 40—17)

This invention relates to improvements in luggage tags or the like and more particularly to a novel tag for use on hand luggage.

Those who do considerable traveling in public conveyances with substantial amounts of luggage often find it expedient, or necessary, to surrender possession of such luggage to the carrier while occupying such conveyances. Reclaiming the luggage at a check room of the carrier, or at hotels or the like, often results in irritating delays, because of a lack of an easy and quick means for the identification of the luggage. Numerous types of luggage tags have been employed to alleviate such irritations, with varying degrees of success.

Heretofore, luggage tags generally were provided with some sort of strap or wire for fastening them to a bag. The strap type tag using a snap type fastener, although more attractive and more easily fastened and unfastened than other types of tags were often subject to being lost from the bag to which they were attached, because of the facility with which they may be accidently unsnapped, "rubbed open" or pulled open when hit or rubbed by other objects.

Furthermore, luggage tags have been provided with a pocket for containing complete identification of the owner, or if of the cardboard, printed type, with identifying serial numbers or the like, but such tags required the time-consuming and often irritating scrutiny of a baggage clerk, particularly when the luggage was piled amid masses of other luggage, such as is common at airports, railroad depots or the like.

Thus, a primary object of this invention is to provide a novel luggage tag that is more easily and quickly identifiable by its owner.

A further object is to provide a novel luggage tag, more easily identifiable by its owner, and which is provided with means for carrying complete identification of its owner.

Another object of this invention is to provide a luggage tag with a more secure fastening and closure means.

Other objects and advantages of the invention will become apparent from the subsequent detailed description taken in conjunction with the accompanying drawing, wherein:

Figure 1 is a reduced scale perspective view of one embodiment of the tag attached to a bag;

Fig. 2 is an enlarged front elevational view of the tag shown in Fig. 1;

Fig. 3 is a sectional view of Fig. 2 along line 3—3;

Fig. 4 is a sectional view of Fig. 2 along line 4—4;

Fig. 5 is a sectional view of Fig. 2 along line 5—5; and

Fig. 6 is an elevational view on a reduced scale of the disassembled front and back pocket members of the tag shown in Fig. 2.

In general, the objects of the invention are accomplished by providing a pocket-like tag for containing complete identification of its owner, a strap rigidly secured at one end to the tag and which is adapted to be looped around some suitable projection on the luggage, then threaded through at least one slot in the tag and fastened, by some suitable fastener, inside the pocket of the tag, thus preventing the fastener from being "rubbed open." Further the tag is provided with externally displayed, eye catching indicia for easy and quick identification by its owner.

As shown in the drawing, the preferred embodiment of the invention comprises a tag 11 having attaching means in the form of a looped strap 12 shown in this instance as secured to the handle 13 of a bag 14. The tag 11 is provided with externally displayed indicia 16 for ready identification of the luggage and is in the form of a pocket for containing complete identification of the owner, such as a business or identification card shown generally at 15. In this instance, the tag 11 comprises a mating pair of flat members 18 and 19 fastened together at their sides and bottom, as by stitching, shown generally at 21. Said members 18 and 19 are of substantially rectangular form, preferably having the upper portions of their side edges tapered somewhat toward each other as at 20. Tapering the sides of pocket 17 thus formed affords a means for resisting accidental loss of the identification card 15 when the tag 11 is detached from the luggage. In addition to the tapered sides 20, members 18 and 19 in this instance have their corners rounded as at 28 in order to reduce their tendency to be caught by other objects. It is to be understood that by using a suitably bendable material, the tag 11 can be formed by making members 18 and 19 integral along a common edge, such as the bottom edge, and then closing the two other sides, as by stitching, to form the pocket.

To enable the owner of a bag to make a quick, and easy identification of his bag under the conditions described, the tag 11 is provided with the eye catching indicia 16 which, in this instance, is a large letter T. Since the tag may be turned over on the bag, in the preferred form the indicia 16 is provided on the exterior of both members 18 and 19.

At the top of one of the pocket members, in this instance the member 18, is secured one end of the strap 12. In the preferred form, the strap 12 is made integral with the one pocket member 18 as at 22. On the free end of the strap 12 is secured one element 23 of a snap fastener, the mating element 24 being secured to one of the pocket members. If the snap fastener were on the exterior of the tag 11, it might be rubbed open by contacting adjacent luggage. To avoid this difficulty, the element 24 is preferably placed on the inside of the pocket. In this instance it is shown as placed on the inside of the member 19.

To close the upper end of the pocket, one or both of the members 18 and 19 are slotted to permit the strap to pass therethrough. In the present instance, a pair of parallel strap receiving slots 26 are formed in the one member 18, these slots being perpendicular to the longitudinal axis of the strap 12 and spaced one above the other and above the snap element 24. A single strap receiving slot 27 is formed in the other member 19, the slot 27 being opposite and in alignment with the uppermost slots 26.

In fastening the above described tag to a piece of luggage, strap 12 is looped around some suitable projection on the luggage, such as handle 13 in Fig. 1, is then, as best seen in Fig. 3, threaded first through slot 27 and then through the uppermost slot 26. It is then reversely bent across the area of member 18 between the pair of slots 26 and is threaded, in cinching relation, through the lower slot 26 to the interior of the pocket, where the mating snap elements 23 and 24 are engaged. In this way the tag 11 is fastened to a piece of luggage and closure of the pocket at its top is effected.

From the above it may be seen that not only is the snap fastener secured against being "rubbed" open, by virtue of its placement inside the pocket but, in addition, a cinching action takes place between the strap 21 and that portion of the pocket member 18 between the two slots 26, affording substantial frictional resistance against any accidental opening of the strap loop, in addition to that offered by a snap fastener alone; that there are no strap ends to obscure the externally displayed indicia; and that the tag offers a means of easy quick identification of the luggage.

Although the invention has been described in connection with a certain specific structural embodiment of the invention, it is to be understood that various modifications and alternative structures may be resorted to without departing from the scope of the invention as defined in the appended claims.

I claim:

1. A device of the character described comprising a substantially flat pocket means, adapted to hold identification cards or the like, a narrow elongated pliant strap integral with the top portion of said pocket means, one element of a fastening device secured at the free end of said strap, the mating element of the fastening device secured inside said means, said means being provided with at least one slot adapted to receive said strap together with the said mating element of the fastening device, said strap being bent to form a loop and being threaded through said slot and fastened inside said pocket, thus closing said pocket and providing loop means for fastening said device to a piece of luggage.

2. A device of the character described comprising a mating pair of flat members at least one of which being provided with externally displayed indicia and which are fastened together at the sides and bottom to form a pocket adapted to hold identification cards and the like, a narrow elongated pliant strap secured at one end to the top portion of one of said members, one element of a fastening means secured to the other end of said strap, the mating element of said fastening means secured to the inside face of the other of said flat members, said pair of members being provided with a plurality of slots adapted to receive said strap and its fastening means element, said strap being bent to form a loop and being threaded through said slots in both of said members and fastened by said fastening means inside said pocket, thus effecting closure of said pocket and providing loop means for fastening said device to a piece of luggage.

3. A device of the character described comprising a mating pair of flat members each of which is provided with externally displayed indicia, and which are fastened together at the sides and bottom to form a pocket adapted to hold identification cards and the like, a narrow elongated pliant strap integral with the top of one of said members, one element of a snap fastener secured at the free end of said strap, said one member having near its top a pair of parallel strap-receiving slots in spaced relation one above the other, the opposite member being provided with a single slot opposite and in alignment with the uppermost slot of said pair of slots, and the mating element of the snap fastener secured to the inside of said other member and in spaced relation below the lower of the said pair of parallel slots, said strap being bent to form a loop and being threaded inwardly through said single slot and outwardly through said aligned slot and then inwardly through said lower of the pair of slots and snapped in locked position inside said pocket, thus effecting closure of the said pocket and providing loop means for fastening said device to a piece of luggage.

4. A device of the character described comprising a mating pair of flat members which are fastened together at their sides and bottom to form a pocket adapted to hold identification cards and the like, a narrow elongated pliant strap integral with the top of one of said members, said one member having a pair of parallel strap-receiving slots spaced one from the other, the opposite member being provided with a single strap-receiving slot opposite and in alignment with one of said pair of slots, said strap forming a loop with its free end threaded through said aligned slots, across the face of that portion of said one member between the said parallel slots and through the other of said parallel slots to the interior of the pocket to provide cinching action on that portion of said one member between the slots, and cooperating fastening elements being mounted one on the end of said strap and the other on the inner face of one of said members.

References Cited in the file of this patent

UNITED STATES PATENTS

| 116,667 | Bellerive | July 4, 1871 |
| 2,655,747 | Duskin | Oct. 20, 1953 |

FOREIGN PATENTS

| 489,282 | France | Sept. 9, 1918 |